United States Patent
Koishikawa

(10) Patent No.: US 12,533,912 B2
(45) Date of Patent: Jan. 27, 2026

(54) TIRE

(71) Applicant: The Yokohama Rubber Co., LTD., Tokyo (JP)

(72) Inventor: Yoshifumi Koishikawa, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 23 days.

(21) Appl. No.: 18/041,473

(22) PCT Filed: Aug. 16, 2021

(86) PCT No.: PCT/JP2021/029905
§ 371 (c)(1),
(2) Date: Feb. 13, 2023

(87) PCT Pub. No.: WO2022/039127
PCT Pub. Date: Feb. 24, 2022

(65) Prior Publication Data
US 2023/0294457 A1    Sep. 21, 2023

(30) Foreign Application Priority Data
Aug. 18, 2020   (JP) ................................. 2020-138134

(51) Int. Cl.
*B60C 11/12* (2006.01)
*B60C 11/03* (2006.01)

(52) U.S. Cl.
CPC ...... *B60C 11/1204* (2013.01); *B60C 11/0306* (2013.01); *B60C 11/1218* (2013.01); *B60C 11/1259* (2013.01); *B60C 2011/1213* (2013.01)

(58) Field of Classification Search
CPC .............. B60C 11/1218; B60C 11/12; B60C 2011/1213
See application file for complete search history.

(56) References Cited

U.S. PATENT DOCUMENTS 6,427,737 B1    8/2002   Katayama
2012/0168049 A1*  7/2012   Jenkins ............... B60C 11/1281
                                          152/209.21
(Continued)

FOREIGN PATENT DOCUMENTS

EP    0 952 011 A2    10/1999
EP    2 133 217 A1    12/2009
(Continued)

OTHER PUBLICATIONS

Extended European Search Report for Application No. PCT/JP2021029905, dated Sep. 10, 2024.

*Primary Examiner* — Justin R Fischer
*Assistant Examiner* — Nicholas J Weiler
(74) *Attorney, Agent, or Firm* — Thorpe North & Western

(57) ABSTRACT

A pneumatic tire includes a circumferential main groove extending in a tire circumferential direction, a land portion defined by the circumferential main grooves, and a sipe disposed in the land portion. The sipe is formed in a zigzag shape that has an amplitude in a width direction of the sipe while extending in a longitudinal direction of the sipe. A magnitude of the amplitude changes according to a position in a depth direction of the sipe. A depth of a maximum amplitude portion from an opening portion of the sipe in the depth direction of the sipe is located at a position 30% or more of a maximum depth of the sipe. The maximum amplitude portion is a portion where a magnitude of the amplitude is maximum.

17 Claims, 8 Drawing Sheets

(56) References Cited

U.S. PATENT DOCUMENTS

| | | | |
|---|---|---|---|
| 2017/0368883 A1* | 12/2017 | Kigami | B60C 11/0302 |
| 2018/0001708 A1* | 1/2018 | Fujioka | B60C 11/11 |
| 2018/0072104 A1 | 3/2018 | Jin et al. | |
| 2019/0100059 A1* | 4/2019 | Kaji | B60C 11/1218 |
| 2019/0160881 A1 | 5/2019 | Chen et al. | |

FOREIGN PATENT DOCUMENTS

| | | | |
|---|---|---|---|
| JP | 2005-126055 A | 5/2005 |
| JP | 2006-096324 A | 4/2006 |
| JP | 2006-188185 A | 7/2006 |
| JP | 2007-45316 A | 2/2007 |
| JP | 2012-526704 A | 11/2012 |
| JP | 3190836 U | 5/2014 |
| JP | 3190837 U | 5/2014 |
| KR | 10-2010-0055111 A | 5/2010 |

* cited by examiner

| | | CONVENTIONAL EXAMPLE 1 | CONVENTIONAL EXAMPLE 2 | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 |
|---|---|---|---|---|---|---|---|---|---|---|---|---|
| SIPE FORM | | THREE DIMENSIONS | FLAT PLATE SHAPE | THREE DIMENSIONS | THREE DIMENSIONS | THREE DIMENSIONS | TWO DIMENSIONS | THREE DIMENSIONS | THREE DIMENSIONS | THREE DIMENSIONS | THREE DIMENSIONS | THREE DIMENSIONS |
| LONGITUDINAL AMPLITUDE | OPENING PORTION | 0.7mm | 0mm | 0.7mm | 0.7mm | 0.4mm | 0.7mm | 0.7mm | 0.4mm | 1.0mm | 0.7mm | 0.7mm |
| | MIDDLE | 0.6mm | 0mm | 0.8mm | 0.8mm | 0.8mm | 0.8mm | 0.8mm | 0.5mm | 1.6mm | 0.8mm | 0.8mm |
| | SIPE BOTTOM | 0.4mm | 0mm | 0.2mm | 0.2mm | 0.6mm | 0.2mm | 0.2mm | 0.2mm | 0.6mm | 0.2mm | 0.2mm |
| DEPTH DP OF MAXIMUM AMPLITUDE PORTION FROM OPENING PORTION (SIPE MAXIMUM DEPTH PERCENTAGE) | | 0mm (0%) | — | 3.5mm (50%) | 5.5mm (79%) | 3.5mm (50%) | 3.5mm (50%) | 3.5mm (50%) | 3.5mm (50%) | 3.5mm (50%) | 2.8mm (50%) | 4.8mm (50%) |
| SIPE DEPTH DIRECTION AMPLITUDE | | YES | NONE | YES | YES | YES | NONE | YES | YES | YES | YES | YES |
| SIPE THICKNESS WS | OPENING PORTION | 0.4mm | 0.8mm | 0.4mm | 0.4mm | 0.4mm | 0.4mm | 0.6mm | 0.4mm | 0.4mm | 0.4mm | 0.4mm |
| | MIDDLE | 0.4mm | 1.2mm | 0.4mm | 0.4mm | 0.4mm | 0.4mm | 0.8mm | 0.4mm | 0.4mm | 0.4mm | 0.4mm |
| | SIPE BOTTOM | 0.4mm | 0.4mm | 0.4mm | 0.4mm | 0.4mm | 0.4mm | 0.4mm | 0.4mm | 0.4mm | 0.4mm | 0.4mm |
| MAXIMUM DEPTH DS OF SIPE | | 7mm | 7mm | 7mm | 7mm | 7mm | 7mm | 7mm | 7mm | 7mm | 5.5mm | 9.5mm |
| DEPTH DG OF CIRCUMFERENTIAL MAIN GROOVE | | 8.5mm | 8.5mm | 8.5mm | 8.5mm | 8.5mm | 8.5mm | 8.5mm | 8.5mm | 8.5mm | 8.5mm | 8.5mm |
| IN NEW CONDITION | BRAKING ON ICE | 100 | 95 | 100 | 100 | 98 | 100 | 99 | 102 | 99 | 102 | 98 |
| | BRAKING ON SNOW | 100 | 95 | 100 | 100 | 98 | 100 | 102 | 99 | 102 | 98 | 102 |
| | DRY BRAKING | 100 | 101 | 100 | 100 | 102 | 98 | 98 | 102 | 98 | 102 | 98 |
| WEAR OF 4 MM | BRAKING ON ICE | 100 | 93 | 104 | 102 | 104 | 103 | 102 | 103 | 103 | 104 | 101 |
| | BRAKING ON SNOW | 100 | 96 | 103 | 101 | 103 | 102 | 103 | 98 | 102 | 97 | 103 |
| | DRY BRAKING | 100 | 98 | 103 | 100 | 100 | 101 | 100 | 102 | 99 | 105 | 99 |
| REMOVABILITY | | 100 | 100 | 102 | 100 | 98 | 103 | 99 | 103 | 98 | 104 | 99 |

FIG. 8

TIRE

TECHNICAL FIELD

The present technology relates to a tire.

BACKGROUND ART

Some known tires are provided with so-called sipes, which are cuts formed in a tread portion, in order to, for example, improve performance on ice and snow, which is running performance on snowy roads and frozen road surfaces, and wet performance, which is running performance on wet road surfaces. Among tires having such sipes, there are tires in which the shape of the sipe is devised, for example, the shape of the sipe is formed into a zigzag shape in a longitudinal direction to obtain desired performance.

For example, in a pneumatic tire described in Japan Unexamined Patent Publication No. 2006-096324 A, a sipe is bent in a tire circumferential direction to form a bent portion continuous in a tire width direction, and has a zigzag shape having an amplitude in a tire radial direction at the bent portion. The amplitude in the tire circumferential direction is reduced toward the bottom side of the sipe, thereby improving tire performance during braking and driving and cornering and improving releasability from a mold. Further, in a pneumatic tire described in Japan Unexamined Patent Publication No. 2005-126055 A, an amplitude in a tire radial direction of a bent portion in a sipe having the amplitude in the tire radial direction at the bent portion is larger at a portion on the sipe bottom side than a portion on a tread surface side, thereby improving the tire performance during braking and driving and the tire performance during cornering.

Here, even in a case where performance on ice and snow of the tire is ensured by disposing the sipes on the tread portion, when a groove depth becomes shallow due to wear of the tread portion, rigidity of a land portion becomes high, and thus performance on ice and snow tends to decrease. Therefore, in the tire in which performance on ice and snow is ensured with the sipes, there is room for improvement in terms of ensuring performance on ice and snow when the wear of the tread portion progresses.

SUMMARY

The present technology provides a tire that can suppress a decrease in performance on ice and snow during wear of a tread portion.

A tire according to the present technology includes a circumferential main groove, a land portion, and a sipe. The circumferential main groove extends in a tire circumferential direction. The land portion is defined by the circumferential main grooves. The sipe is disposed in the land portion. The sipe is formed in a zigzag shape that has an amplitude in a width direction of the sipe while extending in a longitudinal direction of the sipe. A magnitude of the amplitude changes according to a position in a depth direction of the sipe. A depth of a maximum amplitude portion from an opening portion of the sipe in the depth direction of the sipe is located at a position 30% or more of a maximum depth of the sipe. The maximum amplitude portion is a portion where a magnitude of the amplitude is maximum.

In the tire, the maximum amplitude portion of the sipe is preferably located at a position where the depth from the opening portion is within a range from 30% or more to 60% or less of the maximum depth of the sipe.

In the tire, the maximum depth of the sipe is preferably within a range from 70% or more to 110% or less of a depth of the circumferential main groove.

In the tire, an amplitude at a position of the opening portion of the sipe is preferably larger than an amplitude at a sipe bottom.

In the tire, an amplitude at a position of the sipe bottom of the sipe is preferably within a range from 0 mm or more to 1.0 mm or less.

In the tire, the sipe is preferably formed in a zigzag shape that has an amplitude in the width direction of the sipe while extending in the longitudinal direction of the sipe and has an amplitude in the width direction of the sipe while heading for the depth direction of the sipe.

In the tire, the sipe preferably has a constant thickness.

In the tire, an amplitude at a position of the opening portion of the sipe is preferably within a range from 0.3 mm or more to 1.3 mm or less.

In the tire, an amplitude at the maximum amplitude portion of the sipe is preferably within a range from 0.5 mm or more to 1.5 mm or less.

In the tire, an amplitude at the maximum amplitude portion of the sipe is preferably within a range from 105% or more to 150% or less of an amplitude at a position of the opening portion.

The tire according to an embodiment of the present technology exerts the effect that can suppress a decrease in performance on ice and snow during wear of a tread portion.

BRIEF DESCRIPTION OF DRAWINGS

FIG. 8 is a table showing results of performance evaluation tests of pneumatic tires.

DETAILED DESCRIPTION

Figure 1:
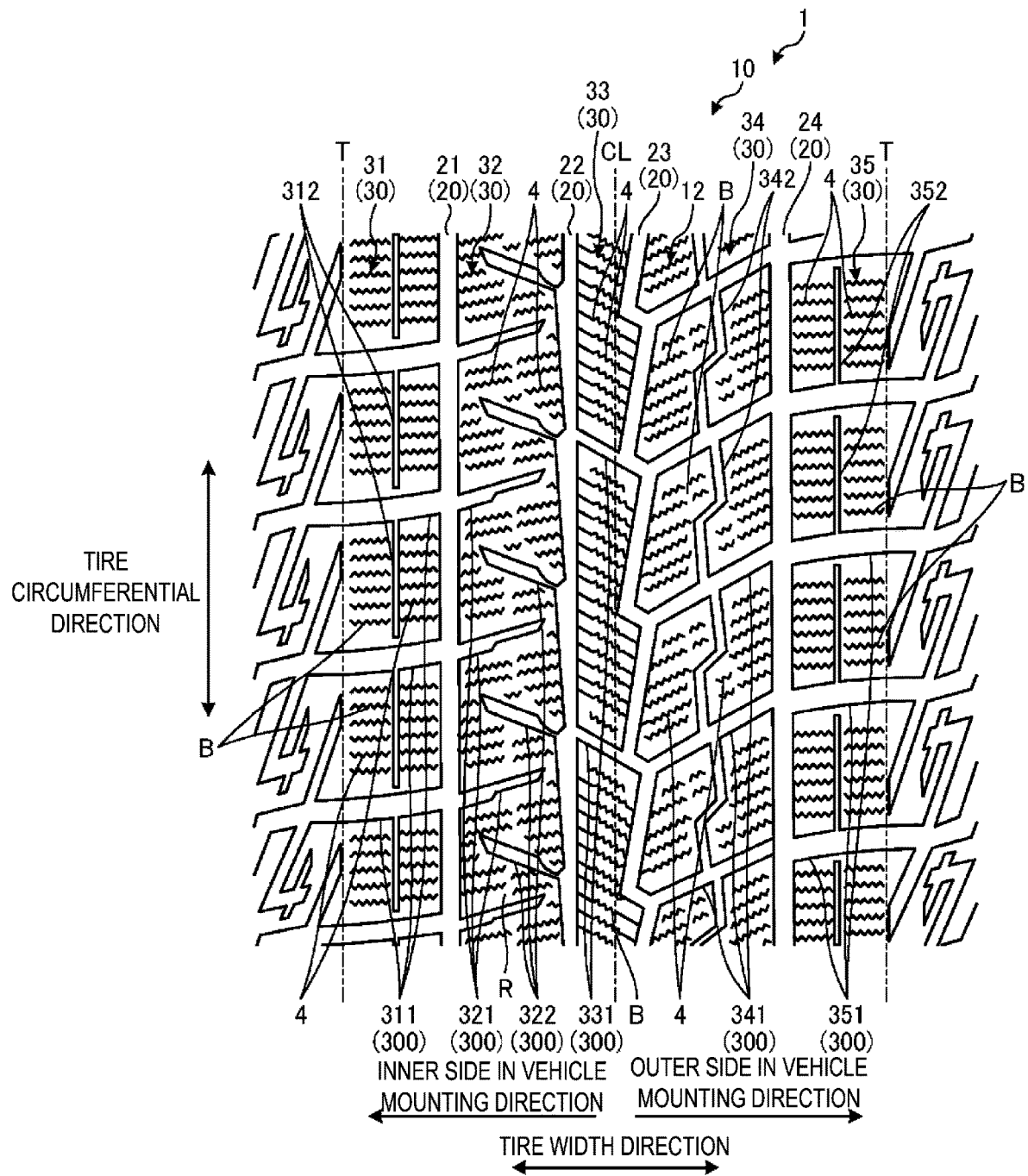
FIG. 1 is a plan view illustrating a tread surface of a pneumatic tire according to an embodiment.

Tires according to embodiments of the present technology will be described in detail below with reference to the drawings. However, the present technology is not limited to the embodiment. Constituents of the following embodiments include elements that can be substituted and easily conceived of by a person skilled in the art or that are essentially identical.

Embodiments

In the following description, a description will be given using a pneumatic tire 1 as an example of the tire according to the embodiments of the present technology. The pneumatic tire 1 as an example of the tire can be inflated with any gas including air and inert gas, such as nitrogen.

Hereinafter, the term "tire radial direction" refers to a direction orthogonal to a tire rotation axis (not illustrated) that is a rotation axis of the pneumatic tire 1, the term "inner side in a tire radial direction" refers to a side toward the tire rotation axis in the tire radial direction, and the term "outer side in the tire radial direction" refers to a side away from the tire rotation axis in the tire radial direction. The term "tire circumferential direction" refers to a circumferential direction with the tire rotation axis as a center axis. Additionally, the term "tire width direction" refers to a direction parallel with the tire rotation axis, the term "inner side in the tire width direction" refers to a side toward a tire equatorial plane (tire equator line) CL in the tire width direction, and the term "outer side in the tire width direction" refers to a side away from the tire equatorial plane CL in the tire width direction. The term "tire equatorial plane CL" refers to a plane that is orthogonal to the tire rotation axis and that runs through the center of the tire width of the pneumatic tire 1. The tire equatorial plane CL aligns, in a position in the tire width direction, with a center line in the tire width direction corresponding to a center position of the pneumatic tire 1 in the tire width direction. The tire width is the width in the tire width direction between portions located on the outermost sides in the tire width direction, or in other words, the distance between the portions that are the most distant from the tire equatorial plane CL in the tire width direction. "Tire equator line" refers to a line in the tire circumferential direction of the pneumatic tire 1 that lies on the tire equatorial plane CL. In the description below, "tire meridian section" refers to a cross-section of the tire taken along a plane that includes the tire rotation axis.

The pneumatic tire 1 according to an embodiment has a designated mounting direction with respect to the vehicle, or in other words, the direction when mounted on the vehicle is specified. In other words, in the pneumatic tire 1 according to an embodiment, the side facing the inner side of the vehicle when mounted on the vehicle is the inner side in the vehicle mounting direction, and the side facing the outer side of the vehicle when mounted on the vehicle is the outer side in the vehicle mounting direction. It should be noted that designation of the inner side in the vehicle mounting direction and the outer side in the vehicle mounting direction are not limited to the case of being mounted on the vehicle. For example, in a case of being mounted on the rim, the directions of the rim with respect to the inner side and the outer side of the vehicle are determined, so in a case where the pneumatic tire 1 is mounted on a rim, the directions with respect to the inner side in the vehicle mounting direction and the outer side in the vehicle mounting direction are specified in the tire width direction. The pneumatic tire 1 includes a mounting direction indicator portion (not illustrated) that indicates the mounting direction with respect to a vehicle. Examples of the mounting direction indicator portion include a mark and a recess/protrusion on a sidewall portion of the tire. For example, Economic Commission for Europe Regulation 30 (ECE R30) requires that a mounting direction indicator portion is provided on the sidewall portion on the outer side in the vehicle mounting direction when the tire is mounted on the vehicle. The pneumatic tire 1 according to the present embodiment is mainly used for passenger vehicles.

FIG. 1 is a plan view illustrating a tread surface 12 of the pneumatic tire 1 according to an embodiment. The reference sign T denotes a ground contact edge of the pneumatic tire 1 in FIG. 1. The ground contact edge T is defined as a maximum width position in the tire axial direction of the contact surface between the pneumatic tire 1 and a flat plate when the pneumatic tire 1 is mounted on a specified rim, inflated to a specified internal pressure, placed perpendicular to the flat plate in a static state, and loaded with a load corresponding to a specified load.

"Specified rim" refers to an "applicable rim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organisation (ETRTO). Additionally, the specified internal pressure refers to a "maximum air pressure" specified by JATMA, the maximum value in "TIRE LOAD LIMITS AT VARIOUS COLD INFLATION PRESSURES" specified by TRA, or "INFLATION PRESSURES" specified by ETRTO. Additionally, the specified load refers to a "maximum load capacity" specified by JATMA, the maximum value in "TIRE LOAD LIMITS AT VARIOUS COLD INFLATION PRESSURES" specified by TRA, or "LOAD CAPACITY" specified by ETRTO. However, in the case of JATMA, for a tire for a passenger vehicle, the specified internal pressure is an air pressure of 180 kPa, and the specified load is 88% of the maximum load capacity.

A tread portion 10 of the pneumatic tire 1 is made of a rubber material (tread rubber) and is exposed on the outermost side of the pneumatic tire 1 in the tire radial direction, with the surface thereof constituting the contour of the pneumatic tire 1. The surface of the tread portion 10 forms the tread surface 12 that is a surface that comes into contact with the road surface when a vehicle (not illustrated) on which the pneumatic tires 1 are mounted travels.

The pneumatic tire 1 includes, on the tread surface 12, a plurality of circumferential main grooves 20 extending in the tire circumferential direction, a plurality of land portions 30 defined by the circumferential main grooves 20, a plurality of lug grooves 300 disposed in each of the land portions 30, and a plurality of Sipes 4 disposed in each of the land portions 30. Here, "circumferential main groove" refers to a groove on which a wear indicator must be provided as specified by JATMA and that extends in the tire circumferential direction and typically has a groove width of 5.0 mm or more and a groove depth of 6.5 mm or more. "Lug groove" refers to a lateral groove extending in a direction intersecting with the circumferential main groove (tire width direction) and typically having a groove width of 1.0 mm or more and a groove depth of 3.0 mm or more.

The sipes are formed in a narrow groove shape in the tread surface. When the pneumatic tire 1 is mounted on a specified rim and inflated to a specified internal pressure in an internal pressure condition, wall surfaces constituting the narrow groove do not come in contact with one another in a case where no load is applied to the pneumatic tire 1. The wall surfaces constituting the narrow groove or at least parts of portions provided on the wall surfaces come in contact with one another due to deformation of the land portion in a case where the narrow groove is located in a portion of the ground contact surface formed on a flat plate when a load is applied to the pneumatic tire 1 on the flat plate in the perpendicular direction or in a case where the land portion in which the narrow grooves are formed flexes. In the present embodiment, the sipe 4 has a groove width of 0.4 mm or less, and a maximum depth from the tread surface 12 of within the range from 2.0 mm or more to 7.0 mm or less. The pneumatic tire 1 according to the present embodiment is configured as a studless tire in which the sipes 4 are provided on the tread surface 12. Therefore, in addition to the wear indicator, a platform indicating that the groove depth becomes 50% of the groove depth when the pneumatic tire 1 is not used due to wear of the tread portion 10 is disposed in the circumferential main grooves 20.

As the circumferential main grooves 20 disposed on the tread surface 12, in the present embodiment, respective four circumferential main grooves 21 to 24 are provided at predetermined intervals in the tire width direction. As illustrated in FIG. 1, among the respective four circumferential main grooves 21 to 24, the two circumferential main grooves 21, 22 are provided on the inner side in the vehicle mounting direction and the two circumferential main grooves 23, 24 are provided on the outer side in the vehicle mounting direction with the tire equatorial plane CL as a boundary. Here, the inner side in the vehicle mounting direction and the outer side in the vehicle mounting direction are defined as directions of the pneumatic tire 1 when the pneumatic tire 1 is mounted on the vehicle. Additionally, the two circumferential main grooves 21, 24 on the outermost side in the vehicle mounting direction are defined as shoulder main grooves, and the two circumferential main grooves 22, 23 on the inner side in the tire width direction are defined as center main grooves.

In the present embodiment, each of the shoulder main grooves 21, 24 has a straight shape. In contrast, the center main grooves 22, 23 have an amplitude in the tire width direction while extending in the tire circumferential direction to form a zigzag shape. In particular, while a groove wall on the tire equatorial plane CL side of the center main groove 22 on the inner side in the vehicle mounting direction has a straight shape, the groove wall on the ground contact edge T side has an amplitude in the tire width direction while extending in the tire circumferential direction to form a zigzag shape. Note that the number of circumferential main grooves is not limited to the one described above, and three or five or more circumferential main grooves may be disposed on the tread surface 12.

In the present embodiment, the land portions 30 defined by the circumferential main grooves 20 are defined and formed to be five rows of land portions 31 to 35 extending in the tire circumferential direction by the four circumferential main grooves 21 to 24 disposed on the tread surface 12. Among the five rows of the land portions 31 to 35, the respective land portions 31, 35 defined on the outer side in the tire width direction by the shoulder main grooves 21, 24 are defined as shoulder land portions. Furthermore, the respective land portions 32, 34 defined on the inner side in the tire width direction by the shoulder main grooves 21, 24 are defined as second land portions. The second land portions 32, 34 are adjacent to the shoulder land portions 31, 35 while the above-described circumferential main grooves 21, 24 are interposed therebetween, respectively. Additionally, the land portion 33 defined between the center main grooves 22, 23 is defined as a center land portion. The center land portion 33 is provided extending on the tire equatorial plane CL.

Note that in the present embodiment, only the single center land portion 33 exists, but in a configuration having five or more circumferential main grooves, a plurality of center land portions are formed. Furthermore, in a configuration with three circumferential main grooves, the center land portion also serves as the second land portion.

In the present embodiment, six types of lug grooves 311, 321, 322, 331, 341, 351 disposed at different positions in the tire width direction are provided as the lug grooves 300 disposed in the land portion 30 formed in this manner. Specifically, the shoulder land portions 31, 35 on both sides in the tire width direction include a plurality of the lug grooves 311, 351, respectively, as the lug grooves 300.

These lug grooves 311, 351 have one end portions opening to the shoulder main grooves 21, 24, respectively, extend outer side in the tire width direction, and have the other end portions terminating within regions across the ground contact edges T. The plurality of lug grooves 311, 351 are provided repeatedly in the tire circumferential direction in the shoulder land portions 31, 35, respectively. Therefore, the shoulder land portions 31, 35 are defined into a plurality of blocks B (shoulder blocks) by the lug grooves 311, 351. Each of these blocks B includes circumferential narrow grooves 312, 352 extending in the tire circumferential direction and the plurality of sipes 4 extending in the tire width direction. Among them, the circumferential narrow grooves 312, 352 are formed in a straight shape.

The second land portion 32 on the inner side in the vehicle mounting direction includes two types of the plurality of lug grooves 321, 322 as the lug grooves 300 and the plurality of sipes 4 extending in the tire width direction. The lug groove 321 (first lug groove) has one end portion facing one end portion of the above-described lug groove 311 and opening to the shoulder main groove 21 and the other end portion terminating within the second land portion 32. The lug groove 322 (second lug groove) has one end portion opening to the center main groove 22 and the other end portion terminating within the second land portion 32. In the present embodiment, the lug groove 322 has the one end portion opening to a corner portion projecting to the ground contact edge T side in the center main groove 22 having the zigzag shape. Therefore, the lug groove 321, 322 has a semi-closed structure that does not cross the second land portion 32. Further, these respective lug grooves 321, 322 are disposed in a staggered pattern (alternated) in the tire circumferential direction, inclined and extend in the same direction in the tire circumferential direction, and overlap with one another in the tire width direction. Therefore, the second land portion 32 is formed as a rib R that is continuous in the tire circumferential direction without being divided in the tire circumferential direction by the lug grooves 321, 322.

The center land portion 33 includes the plurality of center lug grooves 331 as the lug grooves 300. The lug groove 331 is formed to extend in the tire width direction between the two center main grooves 22, 23, and has respective both end portions opening to the center main grooves 22, 23. In the present embodiment, one end portion of the lug groove 331 opens to a corner portion projecting toward the tire equatorial plane CL side in the center main groove 23 having the zigzag shape, and extends along the extension direction of the short portion of the center main groove 23. The lug grooves 331 are provided on every other one of the corner portions forming the zigzag of the center main groove 23. The center land portion 33 is defined into the plurality of blocks B by the plurality of lug grooves 331, and the plurality of sipes 4 extending in the tire width direction are provided in each of the blocks B.

The second land portion 34 on the outer side in the vehicle mounting direction includes a plurality of lug grooves 341 as the lug grooves 300. The lug groove 341 is formed to extend in the tire width direction between the center main groove 23 and the shoulder main groove 24 adjacent to one another and has one end opening to the center main groove 23 and the other end opening to the shoulder main groove 24. In the present embodiment, the lug groove 341 has one end portion opening to a corner portion projecting to the ground contact edge T side in the center main groove 23 having the zigzag shape and the other end portion facing one end portion of the above-described lug groove 351 and opening to the shoulder main groove 24. The second land portion 34 is defined into the plurality of blocks B by the plurality of lug grooves 341. Each of these blocks B includes a circumferential narrow groove 342 and the plurality of sipes 4 extending in the tire width direction. Among them, the circumferential narrow groove 342 has an amplitude in the tire width direction while extending in the tire circumferential direction to form a zigzag shape.

Note that the pneumatic tire 1 according to the present embodiment has a meridian cross-section shape similar to that of a known pneumatic tire. Here, the meridian cross-section form of the pneumatic tire refers to the cross-sectional shape of the pneumatic tire as it appears on a plane normal to the tire equatorial plane CL. Although not illustrated, in a tire meridian cross-sectional view, the pneumatic tire 1 according to the present embodiment includes bead portions, the sidewall portions, shoulder portions, and the tread portion 10 from inside to outside in the tire radial direction. Also, in a tire meridian cross-sectional view, for example, the pneumatic tire 1 includes a carcass layer extending from the tread portion 10 to the bead portions on both sides and wound around a pair of bead cores, and a belt layer and a belt reinforcing layer formed in that order on the carcass layer on the outer side in the tire radial direction.

Each of the sipes 4 disposed in the land portion 30 is formed to extend at an angle close to an angle of the tire width direction. That is, the sipe 4 has an inclination angle in the tire circumferential direction with respect to the tire width direction within the range from 0° or more to 45° or less. The angle of the sipe 4 in the extension direction in this case is an angle of a straight line passing through both ends of the sipe 4 in the extension direction. In this way, the end portion of the sipe 4 extending at the angle close to the angle of the tire width direction may terminate within the land portion 30, or the end portion may open to a groove, such as the circumferential main groove 20.

Figure 2:
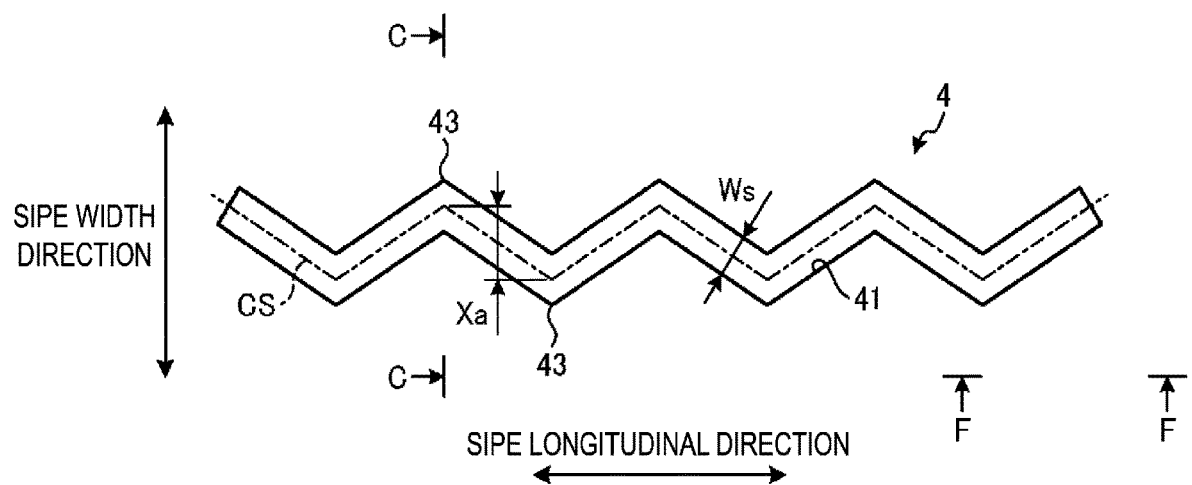
FIG. 2 is a plan view of a sipe illustrated in FIG. 1.

FIG. 2 is a plan view of the sipe 4 illustrated in FIG. 1. Note that FIG. 2 is a schematic view illustrating an outline of the configuration of the sipe 4 illustrated in FIG. 1. The sipe 4 disposed in the land portion 30 is formed in the zigzag shape by repeatedly bending and having an amplitude in the width direction of the sipe 4 while extending in the longitudinal direction of the sipe 4. The longitudinal direction of the sipe 4 in this case is the extension direction of the sipe 4, and the width direction of the sipe 4 is a direction orthogonal to the longitudinal direction of the sipe 4 in plan view. In other words, the sipe 4 extends in the longitudinal direction of the sipe 4 while having an amplitude in the width direction of the sipe 4 to form the zigzag shape in plan view viewing the sipe 4 in the depth direction of the sipe 4. Note that the sipe 4 need not have the zigzag shape over the entire region in the longitudinal direction of the sipe 4, and may have a portion extending linearly.

Figure 3:
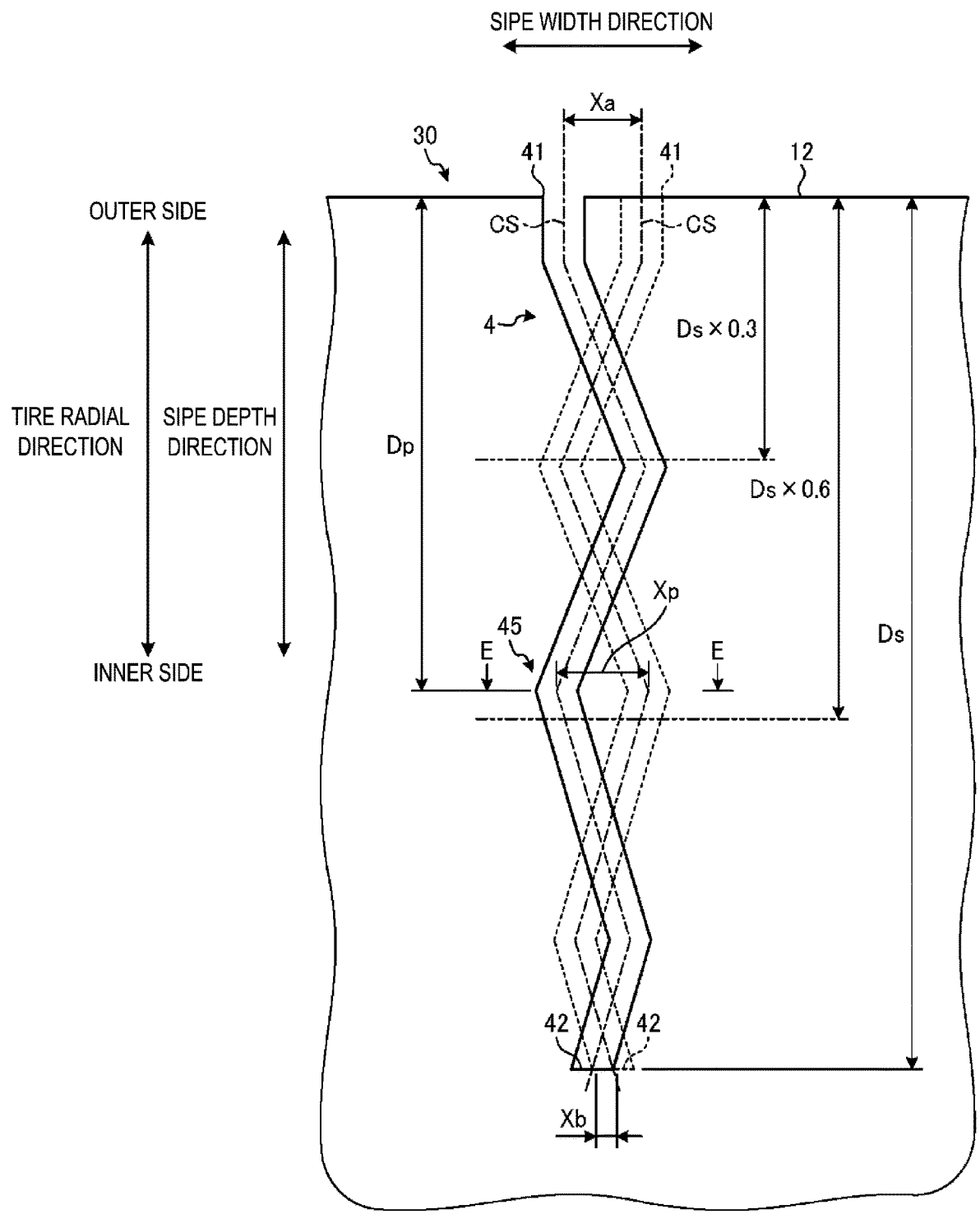
FIG. 3 is a cross-sectional view taken along C-C in FIG. 2.

FIG. 3 is a cross-sectional view taken along C-C in FIG. 2. In the present embodiment, the sipe 4 is a so-called three-dimensional sipe formed in the zigzag shape having an amplitude in the width direction of the sipe 4 while heading for the depth direction of the sipe 4, and having an amplitude in the width direction of the sipe 4 while extending in the longitudinal direction of the sipe 4. That is, the sipe 4 has wall surfaces in a bent shape having an amplitude in the width direction of the sipe 4 in both of a cross-sectional view with the longitudinal direction of the sipe 4 as a normal line direction (a cross-sectional view including the width direction and the depth direction of the sipe 4) and a cross-sectional view with the depth direction of the sipe 4 as a normal line direction (a cross-sectional view including the width direction and the longitudinal direction of the sipe 4).

The sipe 4 formed to have an amplitude in the width direction in both of the longitudinal direction and the depth direction has the magnitude of amplitude when having an amplitude in the width direction while extending in the longitudinal direction that changes according to the position in the depth direction of the sipe 4. Specifically, in the amplitude of the sipe 4, the amplitude at the middle in the depth direction of the sipe 4 is larger than the amplitude at a position of an opening portion 41 to the tread surface 12 and the amplitude at the position of a sipe bottom 42 in the sipe 4. In other words, in the sipe 4, a maximum amplitude portion 45, which is a portion where the magnitude of amplitude when the sipe 4 has an amplitude in the width direction while extending in the longitudinal direction becomes the maximum, is located at the middle in the depth direction of the sipe 4.

The opening portion 41 of the sipe 4 here is the opening portion 41 to the tread surface 12 in a state in which the pneumatic tire 1 is not used, that is, in a state in which the tread portion 10 is not worn.

As described above, the maximum amplitude portion 45, which is a portion where the magnitude of amplitude of the sipe 4 is the maximum, is located at a position where a depth Dp of the sipe 4 from the opening portion 41 in the depth direction of the sipe 4 is 30% or more of a maximum depth Ds of the sipe 4. Specifically, the maximum amplitude portion 45 of the sipe 4 is located at a position where the depth Dp from the opening portion 41 is within the range from 30% or more to 60% or less of the maximum depth Ds of the sipe 4. The maximum depth Ds of the sipe 4 in this case is the maximum depth in the depth direction of the sipe 4 from the opening portion 41 to the sipe bottom 42 of the sipe 4 in the state where the pneumatic tire 1 is not used.

Figure 4:
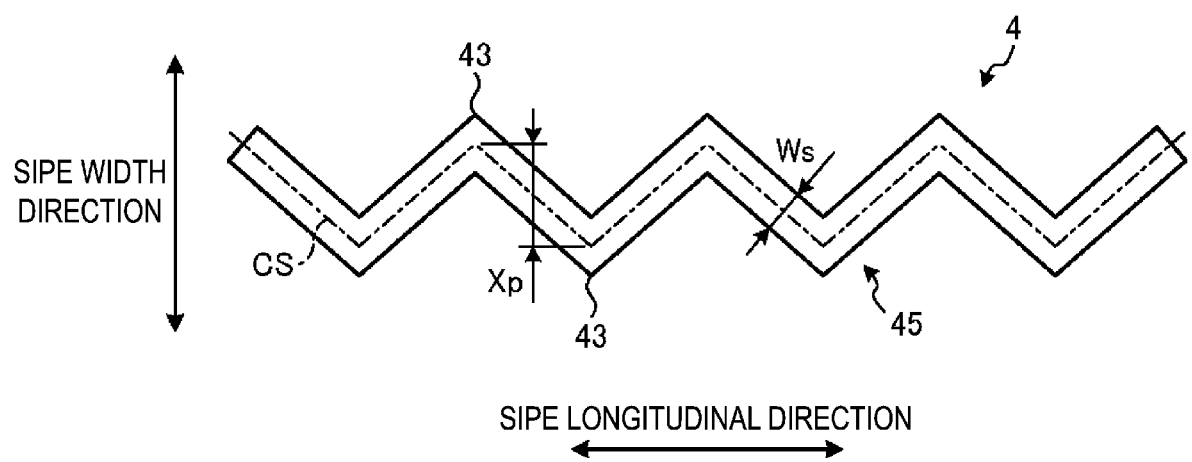
FIG. 4 is a cross-sectional view taken along line E-E in FIG. 3.

FIG. 4 is a cross-sectional view taken along line E-E in FIG. 3. The sipe 4 having the maximum amplitude portion 45 at the middle in the depth direction has an amplitude Xp at the maximum amplitude portion 45 within the range from 105% or more to 150% or less of an amplitude Xa at the position of the opening portion 41. The amplitude in this case has a magnitude of amplitude at a center line CS passing through the center of the distance between the wall surfaces of the sipe 4 or the center in the thickness direction of the sipe 4. That is, the amplitude in this case is a distance in the width direction of the sipe 4 measured on the center line CS between bent portions 43 projecting in directions opposite to one another in the width direction of the sipe 4 among a plurality of the bent portions 43 included in the sipe 4 having an amplitude at the same position in the depth direction of the sipe 4.

In the present embodiment, the sipe 4 has the amplitude at the maximum amplitude portion 45 within the range from 0.5 mm or more to 1.5 mm or less and the amplitude Xa at the position of the opening portion 41 within the range from 0.3 mm or more to 1.3 mm or less. Further, in the sipe 4, the amplitude Xa at the position of the opening portion 41 is larger than an amplitude Xb at the sipe bottom 42. In the present embodiment, the amplitude Xb at the position of the sipe bottom 42 of the sipe 4 is within the range from 0 mm or more to 1.0 mm or less. In the magnitude of amplitude of the sipe 4, the amplitude Xb at the position of the sipe bottom 42 is the smallest, and the sipe 4 need not have an amplitude at the position of the sipe bottom 42. In this way, the amplitude of the sipe 4 that changes in the depth direction of the sipe 4 gradually increases from the opening portion 41 toward the maximum amplitude portion 45, and gradually decreases from the maximum amplitude portion 45 toward the sipe bottom 42.

While the magnitude of amplitude of the sipe 4 changes according to the position in the depth direction of the sipe 4 in this way, a thickness Ws, which is the distance between the opposed wall surfaces of the sipe 4, is constant regardless of the position in the depth direction. For example, in the sipe 4, the thickness Ws at the position of the opening portion 41 and the thickness Ws at the position of the maximum amplitude portion 45 have substantially the same size.

Figure 5:
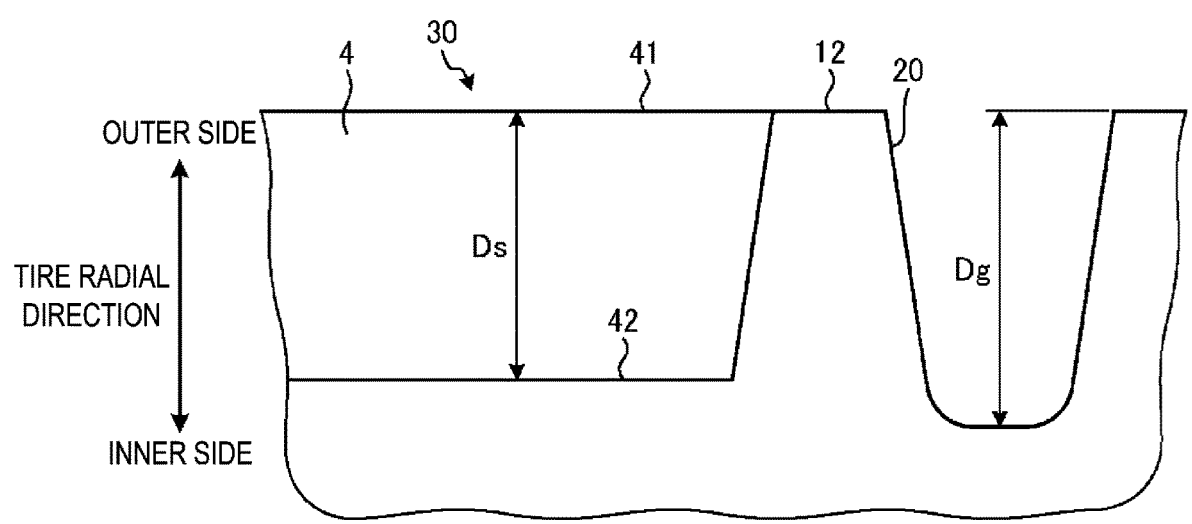
FIG. 5 is a view taken along line F-F in the direction of the arrows in FIG. 2.

FIG. 5 is a view taken along line F-F in the direction of the arrows in FIG. 2. Note that FIG. 5 is a schematic diagram illustrating a relationship between depths of the sipe 4 and the circumferential main groove 20. Further, although FIG. 5 illustrates the sipe 4 whose end portion terminates within the land portion 30, the end portion of the sipe 4 may open to the circumferential main groove 20. The sipe 4 is formed such that the maximum depth Ds in the state where the pneumatic tire 1 is not used becomes a depth close to a depth Dg of the circumferential main groove 20 defining the land portion 30 in which the sipe 4 is disposed. In the present embodiment, the maximum depth Ds of the sipe 4 is within the range from 70% or more to 110% or less of the depth Dg of the circumferential main groove 20. The maximum depth Ds of the sipe 4 is more preferably within the range from 75% or more to 85% or less of the depth Dg of the circumferential main groove 20.

In the event of mounting the pneumatic tire 1 according to the present embodiment on a vehicle, the pneumatic tire 1 is mounted on a rim wheel and inflated with air inside to an inflated state, and then mounted to the vehicle. When doing this, the mounting direction with respect to the vehicle is designated, so the pneumatic tire 1 according to the present embodiment is mounted on the vehicle in the designated direction. In other words, the pneumatic tire 1 is mounted on the vehicle in the direction designated according to the mounting direction indicator portion attached to the sidewall portion.

When the vehicle on which the pneumatic tires 1 are mounted travels, the pneumatic tire 1 rotates while, in the tread surface 12 on the tread portion 10, the tread surface 12 located at the bottom is in contact with the road surface. When the vehicle on which the pneumatic tires 1 are mounted travels on a dry road surface, the vehicle travels mainly by transmitting a driving force and a braking force to the road surface and generating a turning force by friction forces between the tread surface 12 and the road surface.

In addition, during traveling on wet road surfaces, water between the tread surface 12 and the road surface enters grooves, such as the circumferential main grooves 20 and the lug grooves 300, and the sipe 4, and the vehicle travels while draining the water between the tread surface 12 and the road surface by these grooves. As a result, the tread surface 12 easily contacts the road surface, and the vehicle can travel by the friction force between the tread surface 12 and the road surface.

In addition, when the vehicle travels on snow-covered road surfaces, the pneumatic tire 1 presses and compacts snow on the road surface with the tread surface 12, and the snow on the road surface enters the circumferential main grooves 20 and the lug grooves 300 and is pressed and compacted inside the grooves. In this state, when driving force or braking force acts on the pneumatic tire 1, or when a force in the tire width direction acts due to the vehicle turning, a so-called snow column shear force, which is a shear force acting on the snow in the grooves, is generated between the pneumatic tire 1 and the snow. During traveling on snow-covered road surfaces, resistance is generated between the pneumatic tire 1 and the road surfaces by the snow column shear force, and thus driving force and braking force can be transmitted to the road surfaces, and snow traction properties can be ensured. As a result, the vehicle can travel on snow-covered road surfaces.

When the vehicle travels on snow-covered road surfaces or icy road surfaces, the vehicle travels using the edge effects of the circumferential main grooves 20, the lug grooves 300, and the sipes 4. In other words, when the vehicle travels on snow-covered road surfaces or icy road surfaces, the vehicle travels using the resistance caused by the edges of the circumferential main grooves 20, the edges of the lug grooves 300, and the edges of the sipes 4 biting snow surfaces or ice surfaces. At this time, since the sipe 4 is formed in the zigzag shape having an amplitude in the width direction of the sipe 4 while extending in the longitudinal direction, the edge component can be lengthened compared with a case where the sipe 4 is formed in a linear shape. In this way, the edge effect of the sipe 4 can be increased.

Also, during traveling on icy road surfaces, water on the surface of the icy road surface is absorbed by the sipe 4 to remove the water film between the icy road surface and the tread surface 12 to facilitate contact between the icy road surface and a tread ground contact surface 3. As a result, the resistance between the tread surface 12 and the icy road surface is increased due to a friction force and the edge effect, making it possible to ensure the running performance of the vehicle mounted with the pneumatic tires 1.

During traveling of the vehicle, running performance can be ensured by the friction force when the tread surface 12 comes into contact with the road surface, the edge effect brought by the edges of the grooves and the sipes 4, and the snow column shear force when snow on the road surface enters the grooves as described above, and the tread portion 10 is formed of a rubber material. Therefore, when the use distance of the pneumatic tire 1 becomes long by continuously using the vehicle on which the pneumatic tires 1 are mounted, the tread portion 10 is gradually worn according to the use distance. When the tread portion 10 is worn, the groove depth of, for example, the circumferential main grooves 20 disposed on the tread portion 10 becomes shallow, and therefore the rigidity of the land portion 30 defined by the grooves, such as the circumferential main grooves 20, becomes high.

In a case where the rigidity of the land portion 30 is increased, the land portion 30 is difficult to deform while the land portion 30 comes into contact with the ground. Therefore, the ground contact surface of the land portion 30, that is, the tread surface 12 is difficult to deform into a shape along the road surface. In this case, the edges of the circumferential main grooves 20, which define the land portions 30, and the lug grooves 300 and the edges of the sipes 4 disposed in the land portions 30 are difficult to efficiently come into contact with the road surface. Therefore, there is a concern that the edge effect during traveling on snow-covered road surfaces or icy road surfaces is difficult to be effectively exhibited. Therefore, when wear of the tread portion 10 progresses, there is a concern that performance on ice, which is running performance during traveling on icy road surfaces, and performance on snow, which is running performance during traveling on snow-covered road surfaces, are difficult to be effectively ensured.

In contrast, in the pneumatic tire 1 according to the present embodiment, the sipe 4 disposed in the land portion 30 is formed in the zigzag shape in plan view, and the magnitude of amplitude of the zigzag changes according to the position in the depth direction of the sipe 4. Therefore, the actual length of the sipe 4 in plan view, that is, the actual length along the center line CS in the thickness direction changes according to the position of the sipe 4 in the depth direction.

Further, in the sipe 4, the depth Dp of the maximum amplitude portion 45 where the magnitude of amplitude of the zigzag is the maximum from the opening portion 41 of the sipe 4 is at the position 30% or more of the maximum depth Ds of the sipe 4. Therefore, regarding the actual length of the sipe 4 in plan view, the length at the position of the maximum amplitude portion 45 located at the position 30% or more of the maximum depth Ds of the sipe 4 from the opening portion 41 of the sipe 4 is longer than the length at the position of the opening portion 41. Therefore, when the vicinity of the maximum amplitude portion 45 of the sipe 4 disposed in the land portion 30 is exposed due to the progress of wear of the tread portion 10, the actual length of the sipe 4 along the center line CS becomes longer than the actual length along the center line CS of the sipe 4 at the opening portion 41. Accordingly, the edge component of the sipe 4 where the vicinity of the maximum amplitude portion 45 is exposed increases more than the edge component when the pneumatic tire 1 is not used.

Therefore, even in a state in which the rigidity of the land portion 30 increases due to wear of the tread portion 10 and the tread surface 12 is difficult to deform into a shape along the road surface, the edge component of the sipe 4 increases compared to when the pneumatic tire 1 is not used, and thus it is possible to ensure ease of biting of the edge of the sipe 4 on the road surface. Therefore, it is possible to ensure the edge effect brought by the edge component of the sipe 4 during traveling on snow-covered road surfaces or icy road surfaces, and it is possible to ensure performance on ice and performance on snow when wear of the tread portion 10 progresses. This allows suppressing the decrease in performance on ice and snow when the tread portion 10 is worn.

In addition, since the maximum amplitude portion 45 of the sipe 4 is located at a position where the depth Dp from the opening portion 41 is within the range from 30% or more to 60% or less of the maximum depth Ds of the sipe 4, it is possible to more reliably ensure the edge effect when the wear of the tread portion 10 progresses. That is, in a case where the maximum amplitude portion 45 is located at a position where the depth Dp from the opening portion 41 of the sipe 4 exceeds 60% of the maximum depth Ds of the sipe 4, even when the maximum amplitude portion 45 is provided in the sipe 4, there is a concern that the vicinity of the maximum amplitude portion 45 is difficult to be exposed when the tread portion 10 is worn. In this case, the length of the sipe 4 when the wear of the tread portion 10 progresses is difficult to be longer than the length of the sipe 4 at the opening portion 41, and there is a concern that the edge component of the sipe 4 when the wear of the tread portion 10 progresses is difficult to increase effectively.

In contrast, in a case where the maximum amplitude portion 45 is located at a position where the depth Dp from the opening portion 41 of the sipe 4 is within the range from 30% or more to 60% or less of the maximum depth Ds of the sipe 4, when the tread portion 10 is worn, the vicinity of the maximum amplitude portion 45 is likely to be exposed. Accordingly, since the length of the sipe 4 when the wear of the tread portion 10 progresses is likely to be longer than the length of the sipe 4 at the opening portion 41, it is possible to effectively increase the edge component of the sipe 4 when the wear of the tread portion 10 progresses. Therefore, during traveling on snow-covered road surfaces or icy road surfaces in a state in which wear of the tread portion 10 progresses, the edge effect brought by the edge component of the sipe 4 can be more reliably ensured, and the performance on ice and the performance on snow when the tread portion 10 is worn can be more reliably ensured. As a result, it is possible to more reliably suppress the decrease in performance on ice and snow when the tread portion 10 is worn.

In addition, since the maximum depth Ds of the sipe 4 is within the range from 70% or more to 110% or less of the depth Dg of the circumferential main groove 20, the edge effect brought by the edge component of the sipe 4 when wear of the tread portion 10 progresses can be more reliably obtained, and further, the edge component of the sipe 4 when wear progresses can be effectively increased. That is, in a case where the maximum depth Ds of the sipe 4 is less than 70% of the depth Dg of the circumferential main groove 20, since the maximum depth Ds of the sipe 4 is excessively shallow, there is a concern that the sipe 4 is likely to disappear early when wear of the tread portion 10 progresses. In this case, when the wear of the tread portion 10 progresses, there is a concern that the edge effect brought by the edge component of the sipe 4 is difficult to be obtained and performance on ice and performance on snow when the wear of the tread portion 10 progresses are difficult to be ensured. In addition, in a case where the maximum depth Ds of the sipe 4 is larger than 110% of the depth Dg of the circumferential main groove 20, the maximum depth Ds of the sipe 4 is excessively deep, and thus there is a concern that the depth Dp of the maximum amplitude portion 45 from the opening portion 41 of the sipe 4 also becomes excessively deep in association with the maximum depth Ds of the sipe 4. In this case, since the vicinity of the maximum amplitude portion 45 is difficult to be exposed when the tread portion 10 is worn, there is a concern that the length of the sipe 4 is difficult to lengthen when the wear of the tread portion 10 progresses, and the edge component of the sipe 4 when the wear of the tread portion 10 progresses is difficult to increase effectively.

In contrast, in a case where the maximum depth Ds of the sipe 4 is within the range from 70% or more to 110% or less of the depth Dg of the circumferential main groove 20, it is possible to suppress early disappearance of the sipe 4 when the tread portion 10 is worn, and further, it is possible to easily expose the vicinity of the maximum amplitude portion 45 when the tread portion 10 is worn. Accordingly, the edge effect brought by the edge component of the sipe 4 when the wear of the tread portion 10 progresses can be more reliably obtained, and further, the length of the sipe 4 when the wear of the tread portion 10 progresses can be more reliably lengthened. Therefore, the edge component of the sipe 4 when the wear progresses can be effectively increased.

Further, in a case where the maximum depth Ds of the sipe 4 is within the range from 70% or more to 110% or less of the depth Dg of the circumferential main groove 20, the wear amount until the platform disposed in the circumferential main groove 20 is exposed and the wear amount until the vicinity of the maximum amplitude portion 45 is exposed due to the progress of wear of the tread portion 10 can be made approximately the same. As a result, the vicinity of the maximum amplitude portion 45 of the sipe 4 can be exposed at substantially the same timing as the timing at which the platform disposed in the circumferential main groove 20 is exposed due to the progress of wear of the tread portion 10, and the edge component of the sipe 4 can be increased. Therefore, the edge component of the sipe 4 can be increased near the end of lifetime during which the pneumatic tire 1 can be used while ensuring the running performance on icy and snow road surfaces, and the performance on ice and the performance on snow when the rigidity of the land portion 30 is increased due to the progress of wear of the tread portion 10 can be more reliably ensured. As a result, it is possible to more reliably suppress the decrease in performance on ice and snow when the tread portion 10 is worn.

Further, in the sipe 4, the amplitude Xa at the position of the opening portion 41 is larger than the amplitude Xb at the sipe bottom 42. Therefore, the length of the sipe 4 after exposure of the platform disposed in the circumferential main groove 20 can be shortened due to progress of wear of the tread portion 10. As a result, it is possible to shorten the length of the sipe 4 when the wear of the tread portion 10 progresses up to the wear amount or more at which the running performance of the pneumatic tire 1 on icy and snow road surfaces needs to be ensured. Therefore, when the wear of the tread portion 10 progresses up to the wear amount or more at which the running performance of the pneumatic tire 1 on icy and snow road surfaces needs to be ensured, the rigidity of the land portion 30 can be increased, and running performance on dry road surfaces on which a large load is likely to act on the land portion 30 can be ensured.

In addition, since the amplitude Xa at the position of the opening portion 41 of the sipe 4 is larger than the amplitude Xb at the sipe bottom 42, when a blade (not illustrated) with which the sipes 4 have been molded can be easily pulled out when the blade is pulled out from the sipes 4 during vulcanization molding of the pneumatic tire 1. As a result, dry performance, which is running performance on dry road surfaces, can be ensured, and the removability of the blade for molding the sipe 4 from the sipe 4 during vulcanization molding of the pneumatic tire 1 can be ensured.

Further, since the amplitude Xb of the sipe 4 at the position of the sipe bottom 42 of the sipes 4 is within the range from 0 mm or more to 1.0 mm or less, the removability of the blade with which the sipes 4 have been molded from the sipes 4 is ensured and also allows suppressing the excessively low rigidity of the land portions 30 in which the sipes 4 are disposed. That is, in a case where the magnitude Xb at the position of the sipe bottom 42 is larger than 1.0 mm, the magnitude Xb at the position of the sipe bottom 42 is excessively large. Therefore, when the pneumatic tire 1 is vulcanization-molded, there is a concern that the removability when the blade with which the sipes 4 have been molded is pulled out from the sipes 4 is likely to be deteriorated. Further, in a case where the amplitude Xb at the position of the sipe bottom 42 is larger than 1.0 mm, since the amplitude Xb at the position of the sipe bottom 42 is excessively large, there is a concern that the rigidity of the land portion 30 in which the sipes 4 are disposed is excessively low. In this case, when a large load acts on the land portion 30, the land portion 30 is likely to deform, and thus there is a concern that steering stability is difficult to be ensured. In contrast, when the amplitude Xb at the position of the sipe bottom 42 is within the range from 0 mm or more to 1.0 mm or less, it is possible to ensure the ease of removal of the blade with which the sipes 4 have been molded from the sipes 4 and suppress the excessively low rigidity of the land portions 30 in which the sipes 4 are disposed. As a result, it is possible to more reliably ensure the removability of the blade for molding the sipes 4 from the sipes 4 and ensure dry performance.

Further, the sipe 4 is not only formed in the zigzag shape in plan view, but also formed as a so-called three-dimensional sipe that has an amplitude in the width direction of the sipe 4 while heading in the depth direction of the sipe 4. This allows suppressing the excessively low rigidity of the land portion 30 by the sipes 4. That is, since the sipe 4 disposed in the land portion 30 is formed in the three-dimensional sipe, when the land portion 30 deforms by a load acting on the land portion 30 and the wall surfaces of the sipe 4 come into contact with one another, the wall surfaces can easily support one another. This allows suppressing large deformation of the land portion 30, and thus a decrease in ground contact area due to deformation of the land portion 30 can be suppressed, and the edge effect brought by the edge of the sipe 4 can be more reliably obtained. As a result, performance on ice and snow can be more reliably improved.

In addition, since the thickness Ws of the sipe 4 is constant, when wear of the tread portion 10 progresses, it is possible to suppress the change in ground contact area of the land portion 30 in association with the change in the thickness Ws of the sipe 4. Therefore, for example, in the thickness Ws of the sipe 4, in a case where the thickness Ws at the middle position in the depth direction of the sipe 4 or the thickness Ws of the sipe bottom 42 is thicker than the thickness Ws at the opening portion 41, there is a concern that the ground contact area of the land portion 30 decreases when wear of the tread portion 10 progresses. In this case, as the ground contact area of the land portion 30 decreases, the friction force between the land portion 30 and the road surface also decreases. Therefore, there is a concern that the running performance by friction force is also likely to decrease.

In contrast, in a case where the thickness Ws of the sipe 4 is constant, when wear of the tread portion 10 progresses, it is possible to suppress the decrease in ground contact area of the land portion 30, and thus it is possible to suppress the decrease in running performance caused by the decrease in friction force with the road surface. As a result, it is possible to more reliably suppress the decrease in performance on ice and snow when the tread portion 10 is worn.

In addition, since the amplitude Xa of the sipe 4 at the position of the opening portion 41 is within the range from 0.3 mm or more to 1.3 mm or less, while a decrease in friction force with the road surface due to a decrease in ground contact area by large deformation of the land portion 30 is suppressed, the edge effect in a state in which the wear of the tread portion 10 does not progress can be effectively obtained. That is, in a case where the amplitude Xa at the position of the opening portion 41 of the sipe 4 is less than 0.3 mm, the amplitude Xa at the position of the opening portion 41 is excessively small. Therefore, there is a concern that it is difficult to ensure the length of the sipe 4 at the position of the opening portion 41. In this case, since it becomes difficult to ensure the edge component of the sipe 4 at the position of the opening portion 41, there is a concern that the edge effect in a state in which the wear of the tread portion 10 does not progress is difficult to be effectively obtained. Further, in a case where the amplitude Xa at the position of the opening portion 41 of the sipe 4 is larger than 1.3 mm, the amplitude Xa at the position of the opening portion 41 is excessively large. Therefore, the length of the sipe 4 at the position of the opening portion 41 becomes excessively long, and there is a concern that the rigidity of the land portions 30 in which the sipes 4 are disposed becomes excessively low. In this case, when a large load acts on the land portion 30, the ground contact area is easily reduced due to the large deformation of the land portion 30. Therefore, there is a concern that the friction force with the road surface is reduced in association with the decrease in ground contact area of the land portion 30, and running performance by friction force is also likely to be reduced.

In contrast, in a case where the amplitude Xa at the position of the opening portion 41 of the sipe 4 is within the range from 0.3 mm or more to 1.3 mm or less, while the excessively low rigidity of the land portions 30 can be suppressed, the length of the sipe 4 at the position of the opening portion 41 can be ensured. Accordingly, while a decrease in friction force with the road surface due to a decrease in ground contact area by large deformation of the land portion 30 is suppressed, the edge component of the sipe 4 at the position of the opening portion 41 can be more reliably ensured, and the edge effect in a state where the wear of the tread portion 10 does not progress can be effectively obtained. As a result, performance on ice and snow in a state in which wear of the tread portion 10 does not progress can be more reliably ensured.

In addition, since the amplitude Xp at the maximum amplitude portion 45 of the sipe 4 is within the range from 0.5 mm or more to 1.5 mm or less, while a decrease in friction force with the road surface due to a decrease in ground contact area by large deformation of the land portion 30 is suppressed, the edge effect when the wear of the tread portion 10 progresses can be more reliably enhanced. That is, in a case where the maximum amplitude portion 45 of the sipe 4 has the amplitude Xp of less than 0.5 mm, the amplitude Xp at the maximum amplitude portion 45 is excessively small. Therefore, there is a concern that the length of the sipe 4 at the position of the maximum amplitude portion 45 is difficult to be ensured. In this case, since the edge component of the maximum amplitude portion 45 of the sipe 4 is difficult to be increased, even when the vicinity of the maximum amplitude portion 45 is exposed due to the progress of wear of the tread portion 10, there is a concern that the edge effect brought by the edge of the sipe 4 is difficult to be enhanced. Further, in a case where the amplitude Xp at the maximum amplitude portion 45 of the sipe 4 is larger than 1.5 mm, the amplitude Xp at the maximum amplitude portion 45 is excessively large. Therefore, the length of the sipe 4 at the position of the maximum amplitude portion 45 becomes excessively long, and there is a concern that the rigidity of the land portions 30 in which the sipes 4 are disposed becomes excessively low. In this case, when a large load acts on the land portion 30, the ground contact area is easily reduced due to the large deformation of the land portion 30. Therefore, there is a concern that the friction force with the road surface is reduced in association with the decrease in ground contact area of the land portion 30, and running performance by friction force is also easily reduced.

In contrast, in a case where the amplitude Xp at the maximum amplitude portion 45 of the sipe 4 is within the range from 0.5 mm or more to 1.5 mm or less, while the excessively low rigidity of the land portions 30 can be suppressed, the length of the sipe 4 at the position of the maximum amplitude portion 45 can be ensured. Accordingly, while the decrease in friction force with the road surface due to the decrease in ground contact area by large deformation of the land portion 30 is suppressed, the edge component of the sipe 4 at the position of the maximum amplitude portion 45 can be more reliably ensured, and the edge effect brought by the edge of the sipe 4 when the wear of the tread portion 10 progresses can be more reliably enhanced. As a result, it is possible to more reliably suppress the decrease in performance on ice and snow when the tread portion 10 is worn.

In addition, since the amplitude Xp at the maximum amplitude portion 45 of the sipe 4 is within the range from 105% or more to 150% or less of the amplitude Xa at the position of the opening portion 41, while a decrease in friction force with the road surface due to the decrease in ground contact area by large deformation of the land portion 30 is suppressed, the edge effect when the wear of the tread portion 10 progresses can be more reliably enhanced. That is, when the amplitude Xp at the maximum amplitude portion 45 of the sipe 4 is less than 105% of the amplitude Xa at the position of the opening portion 41 of the sipe 4, the amplitude Xp at the maximum amplitude portion 45 is excessively smaller than the amplitude Xa at the position of the opening portion 41. Therefore, there is a concern that ensuring the length of the sipe 4 at the position of the maximum amplitude portion 45 is difficult. In this case, since the edge component of the maximum amplitude portion 45 of the sipe 4 is difficult to be increased, even when the vicinity of the maximum amplitude portion 45 is exposed due to the progress of wear of the tread portion 10, there is a concern that the edge effect brought by the edge of the sipe 4 is difficult to be enhanced. Further, in a case where the amplitude Xp at the maximum amplitude portion 45 of the sipe 4 is larger than 150% of the amplitude Xa at the position of the opening portion 41 of the sipe 4, the amplitude Xp at the maximum amplitude portion 45 is excessively larger than the amplitude Xa at the position of the opening portion 41. Therefore, the length of the sipe 4 at the position of the maximum amplitude portion 45 becomes excessively long, and there is a concern that the rigidity of the land portions 30 in which the sipes 4 are disposed becomes excessively low. In this case, when a large load acts on the land portion 30, the ground contact area is easily reduced due to the large deformation of the land portion 30. Therefore, there is a concern that the friction force with the road surface is reduced in association with the decrease in ground contact area of the land portion 30, and running performance by friction force is also easily reduced.

In contrast, in a case where the amplitude Xp at the maximum amplitude portion 45 of the sipe 4 is within the range from 105% or more to 150% or less of the amplitude Xa at the position of the opening portion 41 of the sipe 4, while the excessively low rigidity of the land portions 30 can be suppressed, the length of the sipe 4 at the position of the maximum amplitude portion 45 can be ensured. Accordingly, while the decrease in friction force with the road surface due to the decrease in ground contact area by large deformation of the land portion 30 is suppressed, the edge component of the sipe 4 at the position of the maximum amplitude portion 45 can be more reliably ensured, and the edge effect brought by the edge of the sipe 4 when the wear of the tread portion 10 progresses can be more reliably enhanced. As a result, it is possible to more reliably suppress the decrease in performance on ice and snow when the tread portion 10 is worn.

Modified Examples

Figure 6:
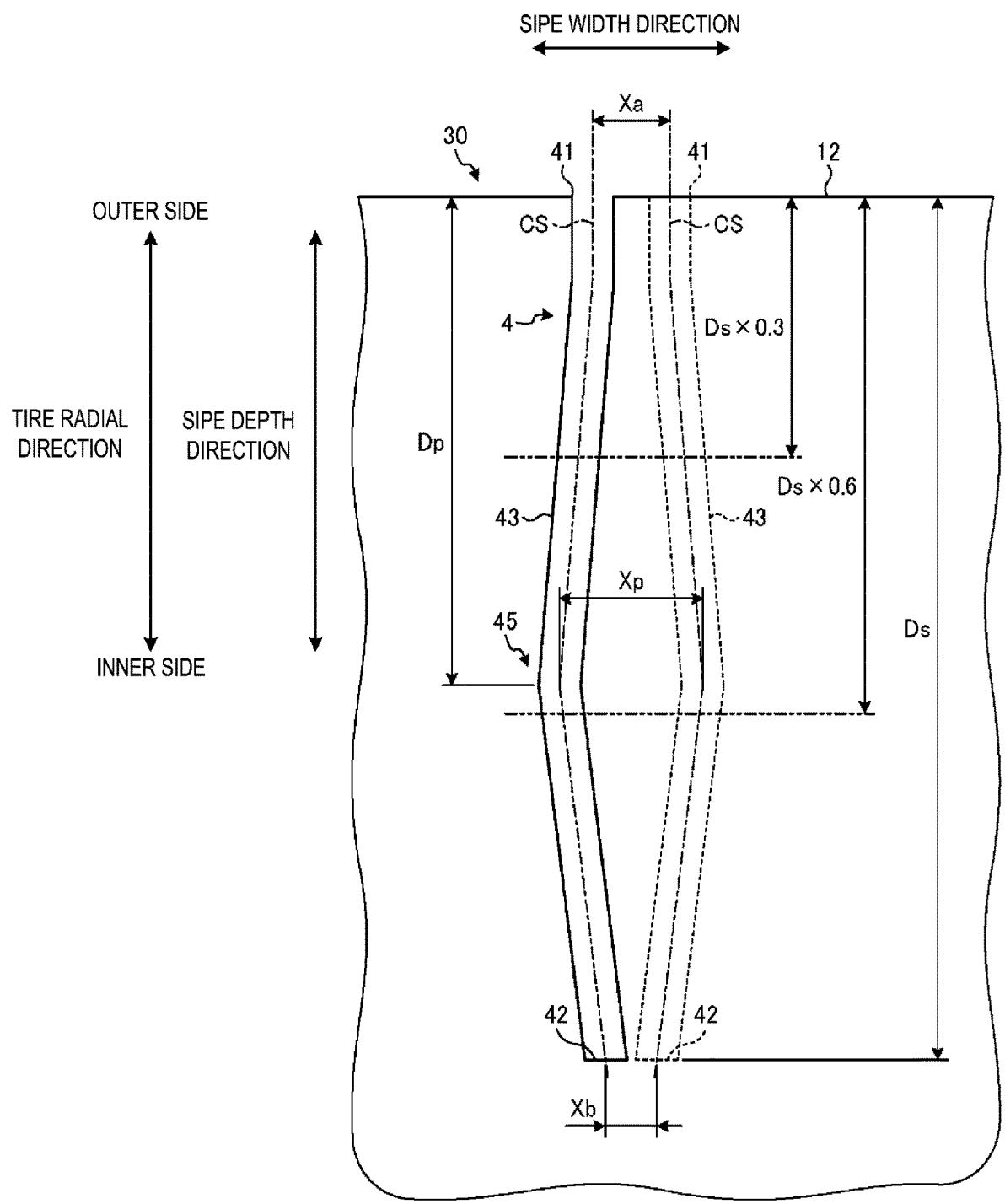
FIG. 6 is an explanatory diagram of a modified example of a pneumatic tire according to an embodiment in a case where the sipe is formed in a two-dimensional sipe.

Note that, in the embodiments described above, the sipes 4 disposed in the land portions 30 are formed in the configuration of three-dimensional sipes, but the sipes 4 may be formed in a configuration other than the three-dimensional sipes. FIG. 6 is an explanatory diagram of a modified example of the pneumatic tire 1 according to an embodiment in a case where the sipe 4 is formed in a two-dimensional sipe. For example, as illustrated in FIG. 6, the sipe 4 disposed in the land portion 30 need not have an amplitude in the width direction of the sipe 4 while heading for the depth direction of the sipe 4. That is, the sipe 4 may be a so-called two-dimensional sipe that does not have an amplitude in the width direction of the sipe 4 while heading for the depth direction of the sipe 4, but has an amplitude in the width direction of the sipe 4 while extending in the longitudinal direction of the sipe 4. The two-dimensional sipe here refers to the sipe 4 having a wall surface not having an amplitude in any cross-sectional view (cross-sectional view including the width direction and the depth direction of the sipe 4) with the longitudinal direction of the sipe 4 as the normal line direction.

Note that FIG. 6 is a cross-sectional view of the sipe 4 viewed in the longitudinal direction of the sipe 4, but the sipe 4 illustrated in FIG. 6 has a configuration at the position of the opening portion 41 and a configuration at the position of the maximum amplitude portion 45 viewed in the depth direction of the sipe 4 similar to those of FIGS. 2 and 4, respectively. In the sipe 4 illustrated in FIG. 6 formed as the two-dimensional sipe, the magnitude of amplitude of the zigzag shape in plan view changes according to the position in the depth direction of the sipe 4, and the depth Dp of the maximum amplitude portion 45 in the depth direction of the sipe 4 from the opening portion 41 is located at the position 30% or more of the maximum depth Ds of the sipe 4.

Thus, regarding the actual length of the sipe 4 illustrated in FIG. 6 in plan view, the length at the position of the maximum amplitude portion 45 located at the position 30% or more of the maximum depth Ds of the sipe 4 from the opening portion 41 of the sipe 4 can be longer than the length at the position of the opening portion 41. Therefore, the edge component of the sipe 4 when wear of the tread portion 10 progresses can be increased. Therefore, in a state in which wear of the tread portion 10 progresses, the rigidity of the land portion 30 increases, and the tread surface 12 is difficult to deform in a shape along the tread surface 12, ease of biting of the edge of the sipe 4 to the road surface can be ensured, and therefore performance on ice and performance on snow can be ensured. This allows suppressing the decrease in performance on ice and snow when the tread portion 10 is worn.

Figure 7:
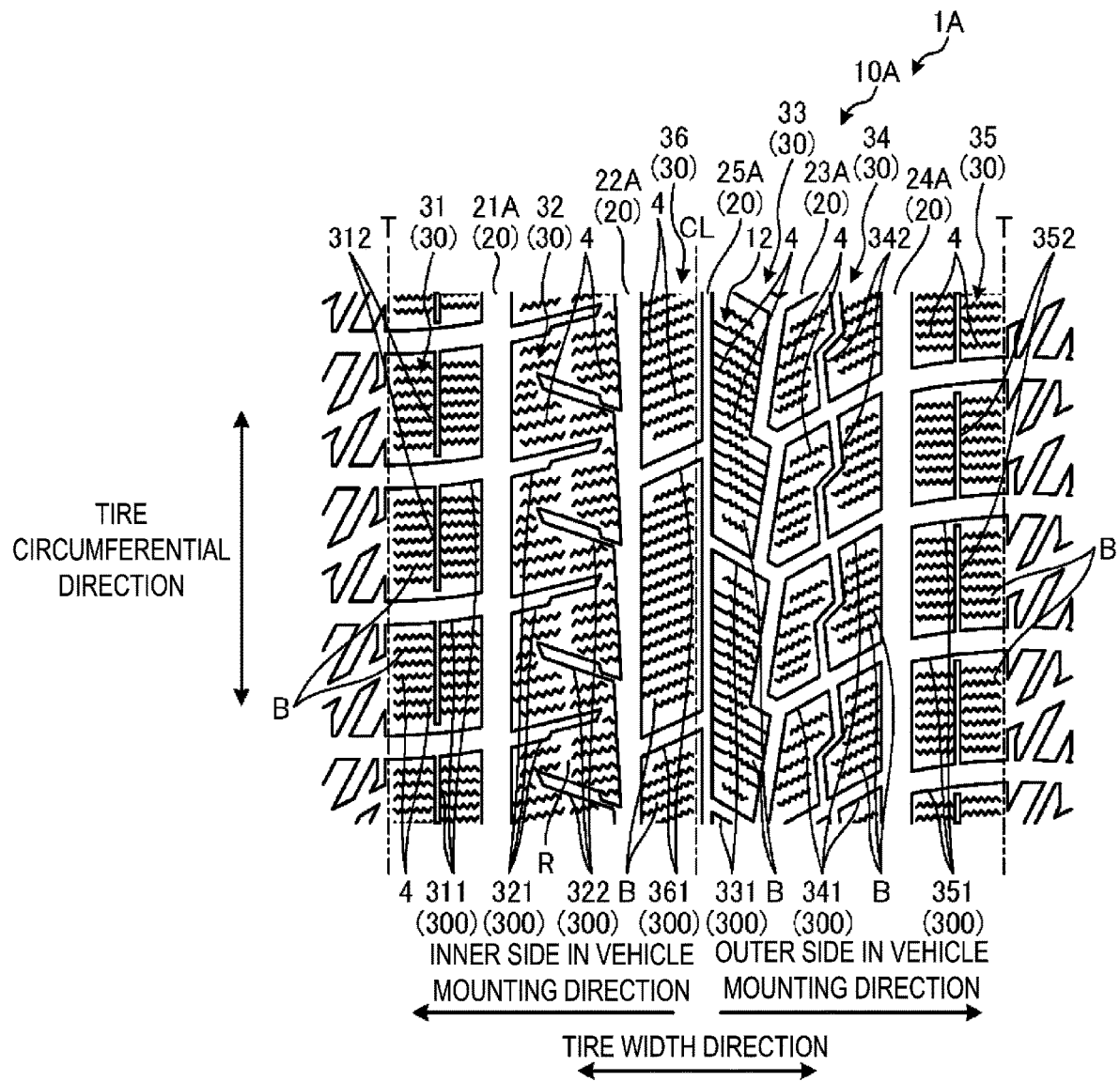
FIG. 7 is a plan view of a modified example of a pneumatic tire according to an embodiment, illustrating a tread surface of a pneumatic tire having different numbers of circumferential main grooves.

Moreover, in the embodiments described above, the four circumferential main grooves 20 are disposed on the tread surface 12, but the circumferential main grooves 20 disposed on the tread surface 12 may be other than four. FIG. 7 is a plan view of a modified example of the pneumatic tire 1 according to an embodiment, illustrating the tread surface 12 of a pneumatic tire 1A having different numbers of the circumferential main grooves 20. As illustrated in FIG. 7, for example, as the circumferential main grooves 20 disposed on the tread surface 12, five circumferential main grooves 21A to 25A may be disposed. As illustrated in FIG. 7, among the five circumferential main grooves 21A to 25A, the two circumferential main grooves 21A, 22A are provided on the inner side in the vehicle mounting direction, the two circumferential main grooves 23A, 24A are provided on the outer side in the vehicle mounting direction with the tire equatorial plane CL as a boundary, and one circumferential main groove 25A is provided in the vicinity of the tire equatorial plane CL. Similar to the embodiments described above, the circumferential main grooves 21A, 24A on the outermost side in the tire width direction are defined as shoulder main grooves, and the circumferential main grooves 22A, 23A on the inner side in the tire width direction with respect to the shoulder main grooves are defined as second main grooves. Further, the circumferential main groove 25A is defined as a center main groove.

In the modified example illustrated in FIG. 7, six land portions 31 to 36 extending in the tire circumferential direction are defined and formed on a tread surface 12A as the land portions 30 defined by the five circumferential main grooves 21A to 25A. In the modified example illustrated in FIG. 7, a center land portion 36 is newly formed in the embodiment, in addition to the center land portion 33, by the two second main grooves 22A, 23A and the center main groove 25A. The center land portion 36 includes a plurality of lug grooves 361 as the lug grooves 300. The lug grooves 361 are formed so as to extend in the tire width direction between the second main groove 22A and the center main groove 25A, and both end portions thereof open to the respective second main groove 22A and center main groove 25A. The center land portion 36 is defined into the plurality of blocks B by the plurality of lug grooves 361, and the plurality of sipes 4 extending in the tire width direction are provided in each of the blocks B.

In the modified example illustrated in FIG. 7 as well, the sipe 4 disposed in the land portion 30 is formed in the zigzag shape in plan view, and the magnitude of amplitude of the zigzag changes according to the position in the depth direction of the sipe 4. The depth Dp of the maximum amplitude portion 45 in the depth direction of the sipe 4 from the opening portion 41 is located at the position 30% or more of the maximum depth Ds of the sipe 4. This allows suppressing the decrease in performance on ice and snow when the tread portion 10 is worn.

Further, a so-called tread pattern appearing on the tread surface 12 by an arrangement configuration of grooves, such as the circumferential main grooves 20 and the lug grooves 300, may be a pattern other than the above-described embodiments or modified examples. Further, all of the plurality of sipes 4 disposed in the land portion 30 need not have a configuration in which the magnitude of amplitude of the zigzag shape in plan view changes according to the position in the depth direction of the sipe 4. Further, the plurality of sipes 4 disposed in the land portion 30 may be a mixture of three-dimensional sipes and two-dimensional sipes.

Furthermore, the above-described embodiment and modified example may be combined as appropriate. In the embodiment described above, although the pneumatic tire 1 is used for description as an example of the tire according to the embodiment of the present technology, the tire according to the embodiment of the present technology may be a tire other than the pneumatic tire 1. The tire according to the embodiment of the present technology may be, for example, a so-called airless tire that can be used without filling a gas.

Examples

FIG. 8 is a table showing results of performance evaluation tests of pneumatic tires. Hereinafter, evaluation tests of performance of the pneumatic tire 1 described above performed on pneumatic tires of Conventional Examples and the pneumatic tires 1 according to the embodiments of the present technology will be described. In the performance evaluation test, tests were performed on braking on ice, which is braking performance on an icy road surface, braking on snow, which is braking performance on a snow-covered road surface, dry braking, which is braking performance on a dry road surface, and removability of a blade in which sipes were molded from the sipes.

The performance evaluation tests were performed by assembling pneumatic tires 1 having a tire nominal size of 195/65R15 91Q specified by JATMA on JATMA standard rim wheels having a rim size of 15×6.5J, mounting the test tires on an evaluation vehicle that was front-wheel drive of 1800 cc displacement, adjusting air pressure to 250 kPa for front wheels and to 240 kPa for rear wheels, and then traveling by the evaluation vehicle.

For the evaluation method for each of test items, braking on ice was evaluated by carrying out a braking test with the evaluation vehicle mounted with the test tires on a test course including icy road surfaces and expressing the reciprocal of a braking distance as an index value with Conventional Example 1 described later being assigned the value of 100. In braking on ice, larger index values indicate shorter braking distance on icy road surfaces and superior performance of braking on ice. Note that, in braking on ice, the index value of 97 or more is assumed to indicate the suppression of degradation of braking on ice with respect to Conventional Example 1.

Also, braking on snow was evaluated by carrying out a braking test with the evaluation vehicle mounted with the test tires on a test course including snow-covered road surfaces and expressing the reciprocal of a braking distance as an index value with Conventional Example 1 described later being assigned the value of 100. In braking on snow, larger index values indicate shorter braking distance on snow-covered road surfaces and superior performance of braking on snow. Note that, in braking on snow, the index value of 97 or more is assumed to indicate the suppression of degradation of braking on snow with respect to Conventional Example 1.

Also, dry braking was evaluated by carrying out a braking test with the evaluation vehicle mounted with the test tires on a test course including dry road surfaces and expressing the reciprocal of a braking distance as an index value with Conventional Example 1 described later being assigned the value of 100. In dry braking, larger index values indicate shorter braking distance on dry road surfaces and superior performance of dry braking. Note that, in dry braking, the index value of 97 or more is assumed to indicate the suppression of degradation of dry braking with respect to Conventional Example 1.

For these braking on ice, braking on snow, and dry braking, respective tests were performed with test tires in new condition in which tread portions were not worn and test tires during wear of 4 mm equivalent to about 50% of depths of circumferential main grooves.

In addition, removability was evaluated by vulcanizing and molding 1000 test tires, counting the number of removal defects, such as damage in a blade and damage in a sipe, when the blade with which the sipes were formed was pulled out from the sipes and the reciprocal of the number of removal defects was expressed as an index value with Conventional Example 1 described later being 100. In removability, larger index values indicate that removal defect of the blade from the sipes is difficult to occur and performance of removability is superior. Note that, in removability, the index value of 97 or more is assumed to indicate the suppression of degradation of removability with respect to Conventional Example 1.

The performance evaluation tests were performed on 11 types of pneumatic tires, which were pneumatic tires of Conventional Examples 1, 2 as examples of the conventional pneumatic tires and pneumatic tires of Examples 1 to 9 as the pneumatic tires 1 according to an embodiment of the present technology. Among them, in Conventional Example 1, the maximum amplitude portion where the sipe has the maximum amplitude formed in a zigzag shape in plan view is located at the opening portion, and the amplitude decreases from the opening portion toward the sipe bottom. In Conventional Example 2, the sipes do not have an amplitude, and the shape of the sipes is a flat plate shape.

In contrast, in Working Examples 1 to 9 as examples of the pneumatic tires 1 according to an embodiment of the present technology, all of the maximum amplitude portions 45 are located at the middles in the depth directions of the sipes 4, that is, positions where the depths Dp from the opening portions 41 of the sipes 4 are 30% or more of the maximum depths Ds of the sipes 4. Furthermore, in the pneumatic tires 1 according to Examples 1 to 9, the magnitude of amplitude at each of the positions of the opening portion 41, the middle, and the sipe bottom 42 of the sipe 4, the depth Dp of the maximum amplitude portion 45 from the opening portion 41 of the sipe 4, whether the shape of the sipe 4 is a three-dimensional shape, the thickness Ws of the sipe 4, and the maximum depth Ds of the sipe 4 are different from one another.

As a result of performing the performance evaluation tests by using the pneumatic tires 1, as shown in FIG. 8, it was found that the pneumatic tires 1 according to Examples 1 to 9 were able to suppress the decrease in both performances of braking on ice and braking on snow at the wear of 4 mm as much as possible with respect to Conventional Example 1, and the comprehensive performances of braking on ice and braking on snow at the wear of 4 mm were able to be improved more than those of Conventional Example 1. In other words, the pneumatic tires 1 according to Examples 1 to 9 can suppress the decrease in performance on ice and snow when the tread portion 10 is worn.

The invention claimed is:

1. A tire, comprising:
    a circumferential main groove extending in a tire circumferential direction;
    a land portion defined by the circumferential main groove; and
    a sipe disposed in the land portion;
    the sipe being formed in a zigzag shape that has an amplitude in a width direction of the sipe while extending in a longitudinal direction of the sipe, a magnitude of the amplitude changing according to a position in a depth direction of the sipe, a depth of a maximum amplitude portion from an opening portion of the sipe in the depth direction of the sipe being located at a position 30% or more of a maximum depth of the sipe, the maximum amplitude portion being a portion where a magnitude of the amplitude is maximum; wherein
    an amplitude at a position of the opening portion of the sipe is within a range from 0.3 mm or more to 0.9 mm or less, and
    the amplitude at the position of the opening portion of the sipe is larger than an amplitude at a sipe bottom.

2. The tire according to claim 1, wherein the maximum amplitude portion of the sipe is located at a position where the depth from the opening portion is within a range from 30% or more to 60% or less of the maximum depth of the sipe.

3. The tire according to claim 2, wherein the maximum depth of the sipe is within a range from 70% or more to 110% or less of a depth of the circumferential main groove.

4. The tire according to claim 3, wherein an amplitude at a position of the sipe bottom of the sipe is within a range from 0 mm or more to 1.0 mm or less.

5. The tire according to claim 4, wherein the sipe is formed in a zigzag shape that has an amplitude in the width direction of the sipe while extending in the longitudinal direction of the sipe and has an amplitude in the width direction of the sipe while heading for the depth direction of the sipe.

6. The tire according to claim 5, wherein the sipe has a constant thickness.

7. The tire according to claim 6, wherein an amplitude at the maximum amplitude portion of the sipe is within a range from 0.5 mm or more to 1.5 mm or less.

8. The tire according to claim 7, wherein an amplitude at the maximum amplitude portion of the sipe is within a range from 105% or more to 150% or less of an amplitude at a position of the opening portion.

9. The tire according to claim 1, wherein the maximum depth of the sipe is within a range from 70% or more to 110% or less of a depth of the circumferential main groove.

10. The tire according to claim 1, wherein an amplitude at a position of the sipe bottom of the sipe is within a range from 0 mm or more to 1.0 mm or less.

11. The tire according to claim 1, wherein the sipe is formed in a zigzag shape that has an amplitude in the width direction of the sipe while extending in the longitudinal direction of the sipe and has an amplitude in the width direction of the sipe while heading for the depth direction of the sipe.

12. The tire according to claim 1, wherein the sipe has a constant thickness.

13. The tire according to claim 1, wherein an amplitude at the maximum amplitude portion of the sipe is within a range from 0.5 mm or more to 1.5 mm or less.

14. The tire according to claim 1, wherein an amplitude at the maximum amplitude portion of the sipe is within a range from 105% or more to 150% or less of an amplitude at a position of the opening portion.

15. The tire according to claim 1, wherein the amplitude at the position of the opening portion of the sipe is from 0.3 mm or more to 0.7 mm or less.

16. A tire, comprising:
a circumferential main groove extending in a tire circumferential direction;
a land portion defined by the circumferential main groove; and
a sipe disposed in the land portion;
the sipe being formed in a zigzag shape that has an amplitude in a width direction of the sipe while extending in a longitudinal direction of the sipe, a magnitude of the amplitude changing according to a position in a depth direction of the sipe, a depth of a maximum amplitude portion from an opening portion of the sipe in the depth direction of the sipe being located at a position 30% or more of a maximum depth of the sipe, the maximum amplitude portion being a portion where a magnitude of the amplitude is maximum; wherein
an amplitude at the maximum amplitude portion of the sipe is within a range from 126% or more to 150% or less of an amplitude at a position of the opening portion, and
the amplitude at the position of the opening portion of the sipe is larger than an amplitude at a sipe bottom.

17. A tire, comprising:
a circumferential main groove extending in a tire circumferential direction;
a land portion defined by the circumferential main groove; and
a sipe disposed in the land portion;
the sipe being formed in a zigzag shape that has an amplitude in a width direction of the sipe while extending in a longitudinal direction of the sipe, a magnitude of the amplitude changing according to a position in a depth direction of the sipe, a depth of a maximum amplitude portion from an opening portion of the sipe in the depth direction of the sipe being located at a position 30% or more of a maximum depth of the sipe, the maximum amplitude portion being a portion where a magnitude of the amplitude is maximum; wherein
an amplitude at a position of the opening portion of the sipe is larger than an amplitude at a sipe bottom, and
an amplitude at a position of the sipe bottom of the sipe is within a range from 0.1 mm or more to 1.0 mm or less.

* * * * *